United States Patent
Yang et al.

(10) Patent No.: US 10,038,796 B2
(45) Date of Patent: Jul. 31, 2018

(54) PREEMPTIVE CREDIT CONTROL

(71) Applicant: Telefonaktiebolaget LM Ericsson (publ), Stockholm (SE)

(72) Inventors: Jiehong Yang, Mölndal (SE); Anders Engström, Lerum (SE); Anders P. Larsson, Mölndal (SE); David Shrader, Wilton Manors, FL (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/440,696

(22) PCT Filed: Jun. 3, 2014

(86) PCT No.: PCT/EP2014/061493
§ 371 (c)(1),
(2) Date: May 5, 2015

(87) PCT Pub. No.: WO2015/185113
PCT Pub. Date: Dec. 10, 2015

(65) Prior Publication Data
US 2016/0301809 A1    Oct. 13, 2016

(51) Int. Cl.
*H04M 11/00*    (2006.01)
*H04M 15/00*    (2006.01)
(Continued)

(52) U.S. Cl.
CPC ...... *H04M 15/854* (2013.01); *H04L 12/1407* (2013.01); *H04L 12/1425* (2013.01);
(Continued)

(58) Field of Classification Search
CPC .... G06Q 20/10; G06Q 20/32; G06Q 20/4016; H06Q 20/409; H06Q 20/3224
(Continued)

(56) References Cited

U.S. PATENT DOCUMENTS 8,156,041 B2 *   4/2012   Jun ................... G06Q 20/10
                                                        705/39
2005/0044224 A1 * 2/2005  Jun ................... G06Q 20/10
                                                        709/225
(Continued)

FOREIGN PATENT DOCUMENTS

RU     2349045 C2    3/2009
RU     2473178 C2    1/2013
(Continued)

OTHER PUBLICATIONS

International Search Report and Written Opinion dated Feb. 3, 2015 for International Application Serial No. PCT/EP2014/061493, International Filing Date: Jun. 3, 2014 consisting of 11-pages.
(Continued)

*Primary Examiner* — William D Cumming
(74) *Attorney, Agent, or Firm* — Christopher & Weisberg, P.A.

(57) ABSTRACT

Methods of pre-emptive credit control, as well as corresponding network elements and a computer program are disclosed. According to one aspect, a method is performed in a network element comprising receiving, from an online charging system, at least one pre-emptive credit control directive for a subscriber, the credit control directive applying to at least one rating group; storing the at least one pre-emptive credit control directive in the network element and applying the at least one pre-emptive credit control directive at content or service delivery start, prior to any service or content received from, or addressing, the subscriber and belonging to the at least one rating group being forwarded from the network element.

26 Claims, 7 Drawing Sheets

(51) Int. Cl.
    *H04L 12/14*    (2006.01)
    *H04W 4/24*    (2018.01)
(52) U.S. Cl.
    CPC .......... *H04M 15/61* (2013.01); *H04M 15/64* (2013.01); *H04M 15/66* (2013.01); *H04M 15/765* (2013.01); *H04M 15/8228* (2013.01); *H04M 15/83* (2013.01); *H04M 15/8351* (2013.01); *H04W 4/24* (2013.01)
(58) Field of Classification Search
    USPC .............................. 455/408; 705/39, 44, 225
    See application file for complete search history.

(56) References Cited

U.S. PATENT DOCUMENTS

| | | | | |
|---|---|---|---|---|
| 2015/0371232 A1* | 12/2015 | Wells | ................... | G06Q 20/409 705/44 |
| 2016/0180342 A1* | 6/2016 | Wells | ................. | G06Q 20/3224 705/44 |

FOREIGN PATENT DOCUMENTS

| | | | |
|---|---|---|---|
| RU | 2012147778 A | | 5/2014 |
| WO | 2008068121 A2 | | 6/2008 |
| WO | 2011101066 A1 | | 8/2011 |

OTHER PUBLICATIONS

Hakala et al.—Network Working Group, Request for Comments: 4006, Category: Standards Track, Title: Diameter Credit-Control Application, XP015041993, ISSN: 0000-0003, Aug. 1, 2005 consisting of 114-pages.

3GPP TS 23.203 V12.4.0; Title: "3rd Generation Partnership Project; Technical Specification Group Services and Systems Aspects; Policy and charging control architecture" (Release 12); Mar. 10, 2014, consisting of 218-pages.

3GPP TS 32.299 V12.4.0; Title: "3rd Generation Partnership Project; Technical Specification Group Services and System Aspects; Telecommunication management; Charging management; Diameter charging applications" (Release 12); Mar. 17, 2014, consisting of 159-pages.

European Communication dated Dec. 21, 2017 for European Patent Application No. 14731560.0, consisting of 7 pages.

Hakala et al., Network Working Group Request for Comments: 4006 Category: Standards Track, "Diameter Credit-Control Application"; Aug. 1, 2005, consisting of 115-pages.

Russian Office Action and Translation dated Jan. 23, 2018 for Russian Patent Application No. 2016150414-07, consisting of 11-pages.

* cited by examiner

Fig. 1

Prior Art

PREEMPTIVE CREDIT CONTROL

CROSS-REFERENCE TO RELATED APPLICATION

This application is a Submission Under 35 U.S.C. § 371 for U.S. National Stage Patent Application of International Application Number: PCT/EP2014/061493, filed Jun. 3, 2014, entitled "PREEMPTIVE CREDIT CONTROL," the entirety of which is incorporated herein by reference.

TECHNICAL FIELD

The disclosure pertains to the field of Credit Control. More particularly the disclosure relates to methods of pre-emptive credit control, as well as to corresponding network elements and to a computer program.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. In a typical cellular radio system, wireless devices or terminals also known as mobile stations and/or user equipment units, UEs, communicate via a radio access network, RAN, to one or more core networks.

The Policy and Charging Control, hereinafter PCC, functionality is deployed in 3 GPP TS 23.203 V12.4.0 (2014-03) for Evolved 3 GPP Packet Switched domain, including both 3 GPP accesses (GERAN/UTRAN/E-UTRAN) and Non-3GPP accesses.

Figure 1:
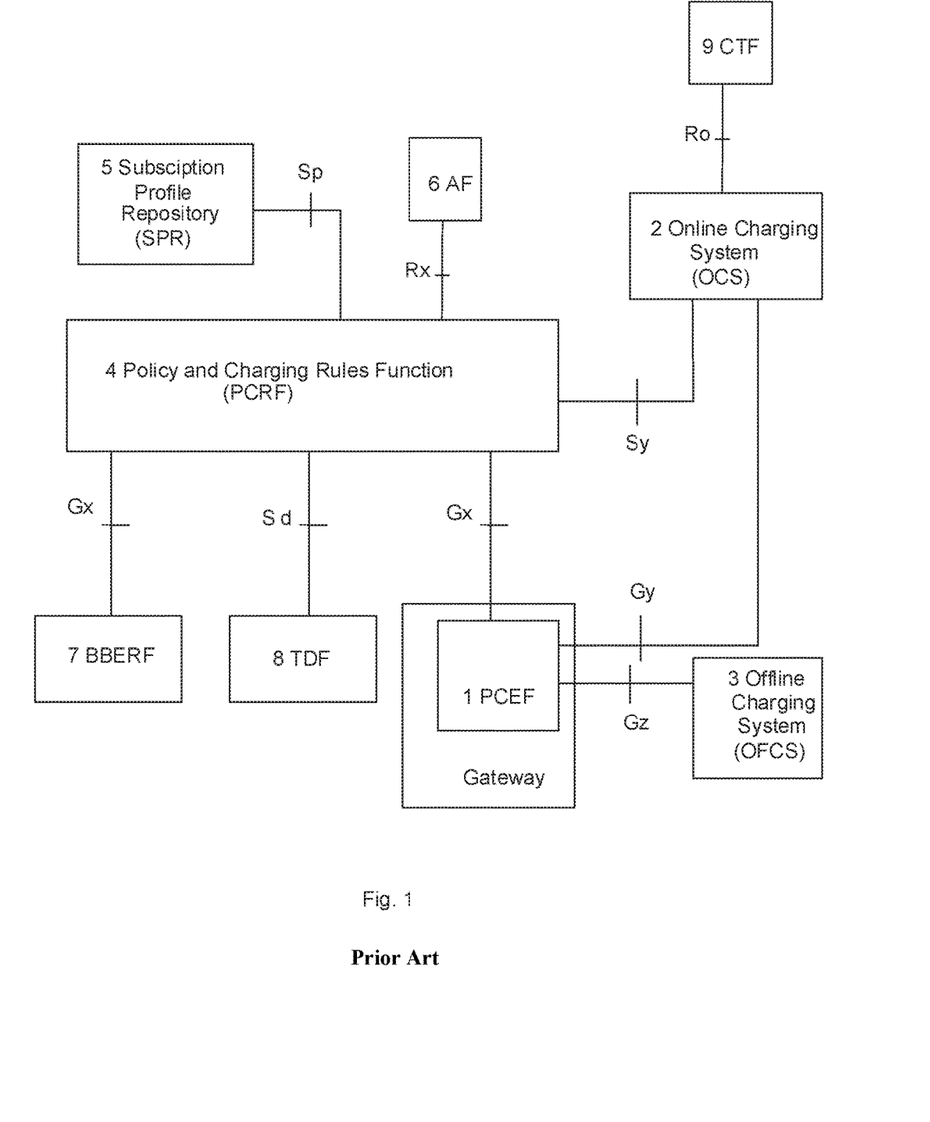

The PCC architecture, which is illustrated in FIG. 1, comprises: a Policy and Charging Enforcement Function, PCEF, 1 which is in charge of traffic flow detection and enforcement of applicable policies to user traffic flows; a Policy and Charging Rules Function, PCRF, 4 which is in charge of providing network control for the traffic flow detection by holding policies and providing PCC rules to the PCEF 1 per user traffic flow basis; a Traffic Detection Function, TDF, 8 which is in charge of performing application detection and reporting detected applications and service data flow descriptions to the PCRF 4; a Bearer Binding and Event Reporting Function, BBERF, 7 which is in charge of receiving from the PCRF 4 Quality of Service, QoS, rules on the treatment of each service data flow and of ensuring that the service data flow is carried over the bearer with the appropriate QoS; an Application Function, AF, 6 which is in charge of submitting to the PCRF a description of the media to be delivered at the bearer layer; a Charging Trigger Function CTF, 9 which is in charge of triggering charging events; an Online Charging System, OCS, 2 which handles charging information affecting, in real-time, the service to be provided and the control of network resources required; an Offline Charging System, OFCS, 3 which handles charging information not affecting the service in real-time, but provided to the operator after having used the network resources; and a Subscription Profile Repository, SPR, 5 which holds subscription and service data for subscribers of the telecommunication system.

Regarding the communication between the above PCC entities, as disclosed in 3GPP TS 23.203 V12.4.0 (2014-03), PCRF and PCEF communicate through a so-called Gx interface, whereas PCRF and AF communicate through a so-called Rx interface. In particular, the PCRF thus provides control rules to the PCEF through this Gx interface, whereas the AF provides the description of the media to be delivered at the bearer layer to the PCRF through this Rx interface.

Regarding the control rules submitted from the PCRF to the PCEF, these control rules include, although are not limited to, those PCC rules disclosed in 3GPP TS 23.203, and can be provided upon establishment or modification of an IP Connectivity Access Network, hereinafter IP-CAN, session.

Still with reference to FIG. 1, different interfaces are used to connect the network elements in accordance with PCC standards. For instance, the PCRF server 4 is connected with the SPR 5 via the Sp interface, with the OCS 2 via the Sy interface, with the TDF 8 via the Sd interface, and with the BBERF 7 via the Gxx interface; the PCEF 1 is connected with the OCS 2 via the Gy interface, with the OFCS 3 via the Gz interface; and the CTF 12 is connected with the OCS 22 via the 'Ro' interface.

3GPP TS 32.299 V12.4.0 (2014-03) for Gy/Ro interface recommends/requires that a credit request is sent for a Rating Group (RG) when the matching traffic is detected. As a rule of diameter credit control, when an answer is received from OCS, Diameter Credit Control Application, DCCA client shall validate that only 'requested' RG can be included. The DCCA client will start failure handling if 'unexpected RG' is received and in some cases even terminate the Packet Data Network, PDN, connection (as a consequence of terminating credit control session).

If the answer from DCCA server is to block or redirect the user, depending on how traffic is handled by DCCA client under the time of waiting for the answer from OCS, it might happen that the 'to be blocked traffic' has passed through the DCCA client. In the redirection case, the user might have to re-attempt to access the original service in order to be redirected since DCCA client missed the moment to send redirection Uniform Resource Locator, URL, to a subscriber while waiting for the answer from OCS.

The above mechanism leads to the waste of an amount of data. Neither end-user nor operator can get benefit from it. When LTE technology is in use, the waste tends to get bigger due to high bandwidth.

SUMMARY

An object of the present disclosure is to provide a network element which seeks to mitigate, alleviate, or eliminate one or more of the above-identified deficiencies in the art and disadvantages singly or in any combination and to provide a solution wherein traffic supposed to be blocked is always blocked.

According to some aspect this disclosure relates to method, performed in a network element, of performing pre-emptive credit control. The method comprises the steps of receiving, from an online charging system, at least one pre-emptive credit control directive for a subscriber, the credit control directive applying to at least one rating group; storing the at least one pre-emptive credit control directive in the network element and applying the at least one pre-emotive credit control directive at content or service delivery start, prior to any service or content received from, or addressing, the subscriber and belonging to the at least one rating group being forwarded from the network element. By receiving pre-emptive credit control, either blocking or redirection of services belonging to certain rating groups, is performed in advance and therefore the handling can be applied immediately when matching traffic is detected. Such a solution will optimize the traffic flow handling in the packet data network gateway, because less buffering needed. The reason is that when PCEF is waiting for answer from OCS, it has in some cases to buffer the traffic, while as in other cases to let the traffic through. For the buffer case, it will challenge PCEF internal buffer capacity in case high speed traffic. It will also impact the performance. Hence, the proposed technique will reduce the amount of 'wasted' payload.

According to some aspects the method further comprises receiving a session request from the subscriber. According to some aspects the method further comprises sending a credit control request for the subscriber to an online charging system; wherein the at least one pre-emptive credit control directive is received in response to the credit control request.

According to some aspects the method further comprises indicating a capability of receiving credit control directives prior to service flow detection. Thereby the proposed technique may be an optional feature that is indicated to the network.

According to some aspects the credit control request is an initial request or an update request. According to some aspects the credit control request is an initial request comprising an indication about relevant rating groups. Hence, the OCS may be informed about rating groups that are likely to be used, and these may then be blocked.

According to some aspects the method further comprises receiving from the online charging system control further information relating to the at least one pre-emptive credit control directive.

According to some aspects the method further comprises blocking service or content that matches the at least one pre-emptive credit control directive. According to some aspects the method further comprises redirecting service or content that matches the at least one pre-emptive credit control directive. According to some aspects the method further comprises forwarding service or content from the network element.

According to some aspects the at least one pre-emptive credit control directive comprises result codes corresponding to rules applying to respective charging groups.

According to some aspects the method relates to a network element for performing pre-emptive credit control, the network element comprising, a network interface and a processing circuitry from the network element, a credit control request, corresponding to a subscriber, wherein the at least one pre-emptive credit control directive is provided in a credit control response sent in response to the credit control request.

According to some aspects the disclosure relates to a method, performed in an online charging system, of enabling pre-emptive credit control in a network element. The method comprising the steps of providing, in the online charging system, at least one pre-emptive credit control directive for a subscriber, applying to at least one rating group, and sending, to the network element, the provided at least one pre-emptive credit control directive, prior to any service or content received from or addressing the subscriber and belonging to the at least one rating group being forwarded from the network element, thereby enabling application of the at least one pre-emptive credit control directive on the service or content at content or service delivery start.

According to some aspects, the method further comprises receiving from the network element, a credit control request, corresponding to a subscriber, wherein the at least one pre-emptive credit control directive is provided in a credit control response sent in response to the credit control request. According to some aspects, the method further comprises receiving an indication of a capability of receiving credit control directives prior to service flow detection.

According to some aspects, the providing is based on network or service requested in the credit control request. According to some aspects, the providing is based on an Access Point Name comprised in the credit control request.

According to some aspects, the providing is based on subscriber data corresponding to the subscriber.

According to some aspects the disclosure relates to an online charging system node for enabling pre-emptive credit control in a network element, the node comprising, a network interface is configured to provide, in the online charging system, at least one pre-emptive credit control directive for a subscriber, applying to at least one rating group, and to send, using the network interface, to the network element, a credit control response, comprising the provided at least one pre-emptive credit control directive prior to any service or content received from or addressing the subscriber and belonging to the at least one rating group is forwarded from the network element and thereby enabling application of the at least one pre-emotive credit control directive on the service or content at content or service delivery start.

According to some aspects the disclosure relates to a computer program comprising computer program code which, when executed in a network element, causes the network element to execute the methods described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 1 3GPP PCC architecture
FIG. 2a Non-Preemptive Result-Code Handling
FIG. 2b Preemptive Result-Code Handling
FIG. 3a Non-Preemptive Redirection Directives
FIG. 3b Preemptive Redirection Directives
FIG. 4 RAR initiated installation of Preemptive Redirection Directives

DETAILED DESCRIPTION

| Abbreviations | |
|---|---|
| AF | Application Function |
| AVP | Attribute Value Pair |
| CCR | Credit Control Request |
| CCA | Credit Control Answer |
| CLCI | Closed Loop Charging Interface |
| CTF | Charging Trigger Function |
| DCCA | Diameter Credit Control Application, |
| FUI | Final-Unit-Indication |

-continued

| Abbreviations | |
|---|---|
| GW | Gateway |
| IP-CAN | IP Connectivity Access Network |
| MSCC | Multiple Services Credit Control |
| OCS | Online Charging System |
| OFCS | Offline Charging System |
| PCC | Policy and Charging |
| PCEF | Policy and Charging Enforcement Function |
| PCRF | Policy and Charging Rules Function |
| PDN | Packet Data Network |
| PDN-GW | Packet Data Network Gateway |
| RG | Rating Group |
| RSU | Request Service Unit |
| SPR | Subscription Profile Repository |
| TDF | Traffic Detection Function |
| URL | Uniform Resource Locator |
| QoS | Quality of Service |

Aspects of the present disclosure will be described more fully hereinafter with reference to the accompanying drawings. The apparatus and method disclosed herein can, however, be realized in many different forms and should not be construed as being limited to the aspects set forth herein. In this disclosure we specifically address the dual SIM card scenario, but the same technique can easily be adapted to a multiple SIM card scenario by someone skilled in the art. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Some of the example embodiments presented herein are directed towards pre-emptive credit control. As part of the development of the example embodiments presented herein, a problem will first be identified and discussed.

Credit handling on a Rating Group, RG, usually representing one service or a group of services, according to existing standard for credit control, such as RFC and 3GPP TSs, starts when payload matching the RG is detected in GW. This leads to 'over usage' risk when the service is supposed to be blocked since GW has to wait for the answer from OCS. This can also lead to 'delay of redirection' and the user has to retry access the service again in order to be redirected.

Many operators loses revenue when home subscribers are roaming in the other network when subscriber should be blocked of using certain service due to lacking of credit or other restriction, or when subscriber should be redirected to a upsell or top-up portal. The payload that initiates the quota control has passed the serving network but eventually being dropped by home GW due to credit control. Home operator has to pay to the roaming partners for the payload that has passed even though home operator doesn't receive any revenue on it.

The solution proposed here is to reduce this type of 'revenue leakage' and in best case to turn the loss into possibility of upselling in case redirection is performed by using pre-emptive credit control directives. Redirection-directives, request of blocking services as well as Quota assignment shall be able to provision via Gy interface in advance to the traffic detection. With pre-emptively installed redirection-directives or request of blocking services, Diameter Credit Control Application, DCCA, Client (such as a gateway) can take action on traffic upon traffic arrival without waiting for answer from OCS.

Figure 2A:
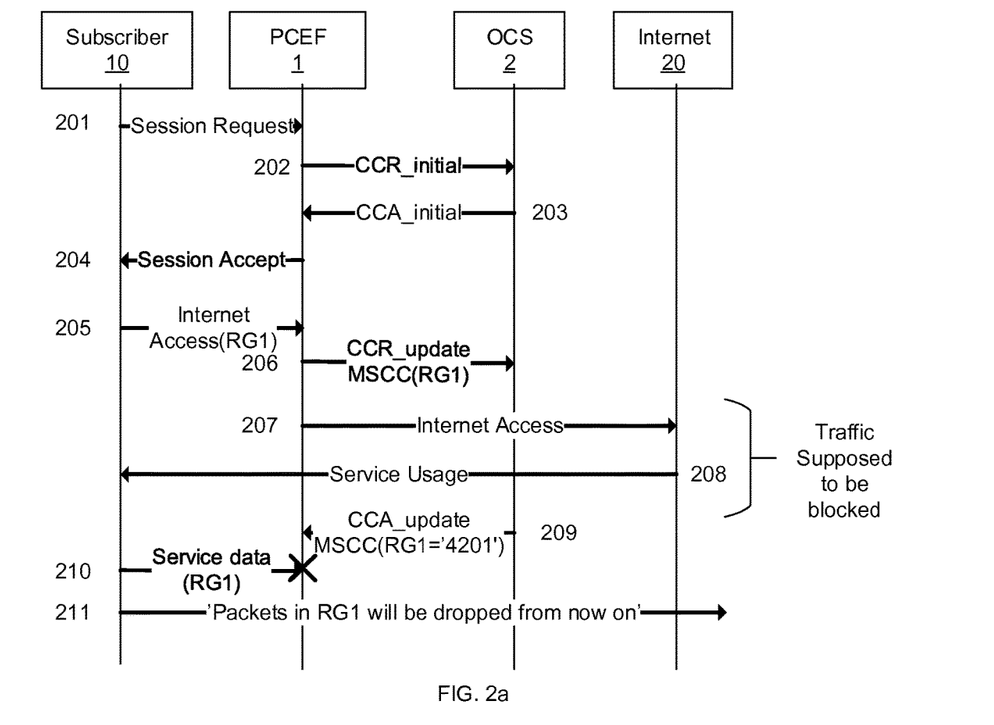

FIG. 2a illustrates an example of Non-Preemptive Result-Code Handling, where the proposed method may be implemented. FIG. 2a illustrates the signaling when an external subscriber 10, e.g. a User Equipment, UE, is establishing a connection to the internet 20 i.e. an internet session.

For a session-based credit-control, several interrogations are needed: the first, intermediate (optional) and the final interrogations as specified in IETF RFC 4006: "Diameter Credit-Control Application", which 3GPP is based on.

An Initial request is used to initiate a credit-control session, and contains credit control information that is relevant to the initiation.

An Update request contains credit-control information for an existing credit-control session. Update credit-control requests SHOULD be sent every time a credit-control re-authorization is needed at the expiry of the allocated quota or validity time. Further, additional service-specific events MAY trigger a spontaneous Update request.

A Termination request is sent to terminate a credit-control session and contains credit-control information relevant to the existing session.

In this example, the network element 1 implementing the PCEF function receives an initial session request 201 which is an IP-CAN Session Activation request. In this example, this is a request on command level. Hence, the service is not specified yet, but it is merely an IP-CAN connection request.

In order to establish the connection, the network element 1 sends a Credit-Control-Request, CCR 202, with CC-Request-Type AVP set to INITIAL_REQUEST to the OCS 2.

Once the reservation has been made, the OCS returns Credit-Control-Answer, CCA, 203 with CC-Request-Type set to INITIAL_REQUEST to the network element in order to authorize the session. Thereafter, the network element 1 sends an IP-CAN Activation Accept 204 to the external subscriber 10 and the service delivery can start 205.

As soon as the service is known, the network element sends a CCR with indicated rating group 206 to the OCS. The CCR message with CC-Request-Type AVP set to UPDATE_REQUEST must be sent by the network element between the INITIAL_REQUEST and TERMINATION_REQUEST either on request of the credit control application within the validity time or if the validity time is elapsed.

The OCS returns Credit-Control-Answer 209 with CC-Request-Type set to UPDATE_REQUEST to the network element 1, in order to allow the content/service delivery to continue. This CCA comprises the Multiple Services Credit Control, MSCC, corresponding to the rating group set in the request. For example, the result code indicates that the content/service is not granted it will be terminated implying that data 210 receiving after the CCA_update 209 will be terminated 211. However, during the time waiting for the response to the UPDATE_REQUEST there may be Internet access requests 207 causing traffic 208 i.e. service usage, passing through the network that should have been blocked.

The proposed technique will now be briefly described referring to FIGS. 5 to 8. It should be appreciated that FIGS. 5 and 6 comprise some operations which are illustrated with a solid and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the border example embodiments. It should be appreciated that these operations need not be performed in order. Furthermore, it should be appreciated that not all of the operations need to be performed. The example operations may be performed in any order and in any combination.

Figure 7:
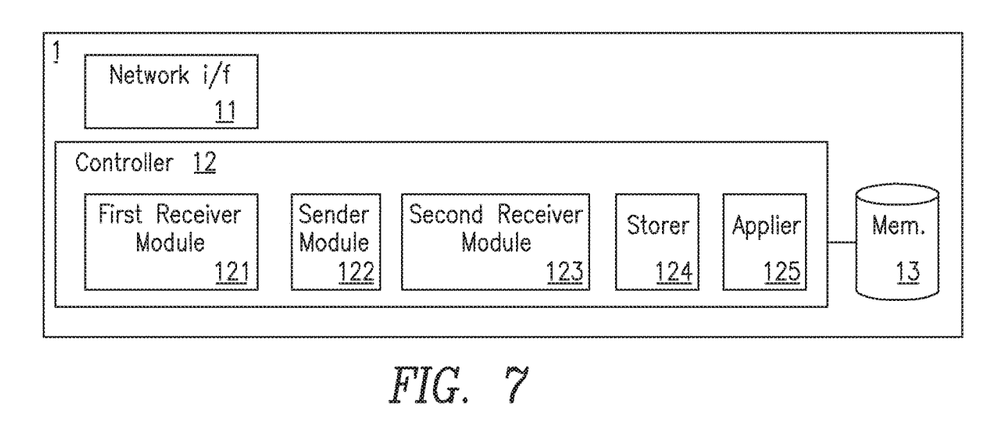
FIG. 7 is an example node configuration of a network element, according to some of the example embodiments.

FIG. 7 illustrates an example of a network element 1 for performing pre-emptive credit control. The network is e.g. a PDN-GW, Packet Data Network Gateway. The network element 1 according to aspects, comprise at least one memory or circuitry 13. The memory 13 is configured to store received or transmitted data and/or executable program instructions. The memory 13 may also be configured to store pre-emptive credit control directives. The memory 13 may be any suitable type of computer readable memory and may be of volatile and/or non-volatile type.

The network element 1 may further comprise further comprises a network interface 11 and processing circuitry or controller 12 which may be configured to receive, using the network interface 11, from an online charging system, at least one pre-emptive credit control directive for a subscriber, the credit control directive applying to at least one rating group; to store the at least one pre-emptive credit control directive in the network element, typically in the memory unit 13. The network element is further configured to apply, the at least one pre-emptive credit control directive at content or service delivery start, prior to any service or content received from, or addressing, the subscriber and belonging to the at least one rating group being forwarded from the network element.

The processing circuitry 12 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Figure 5:
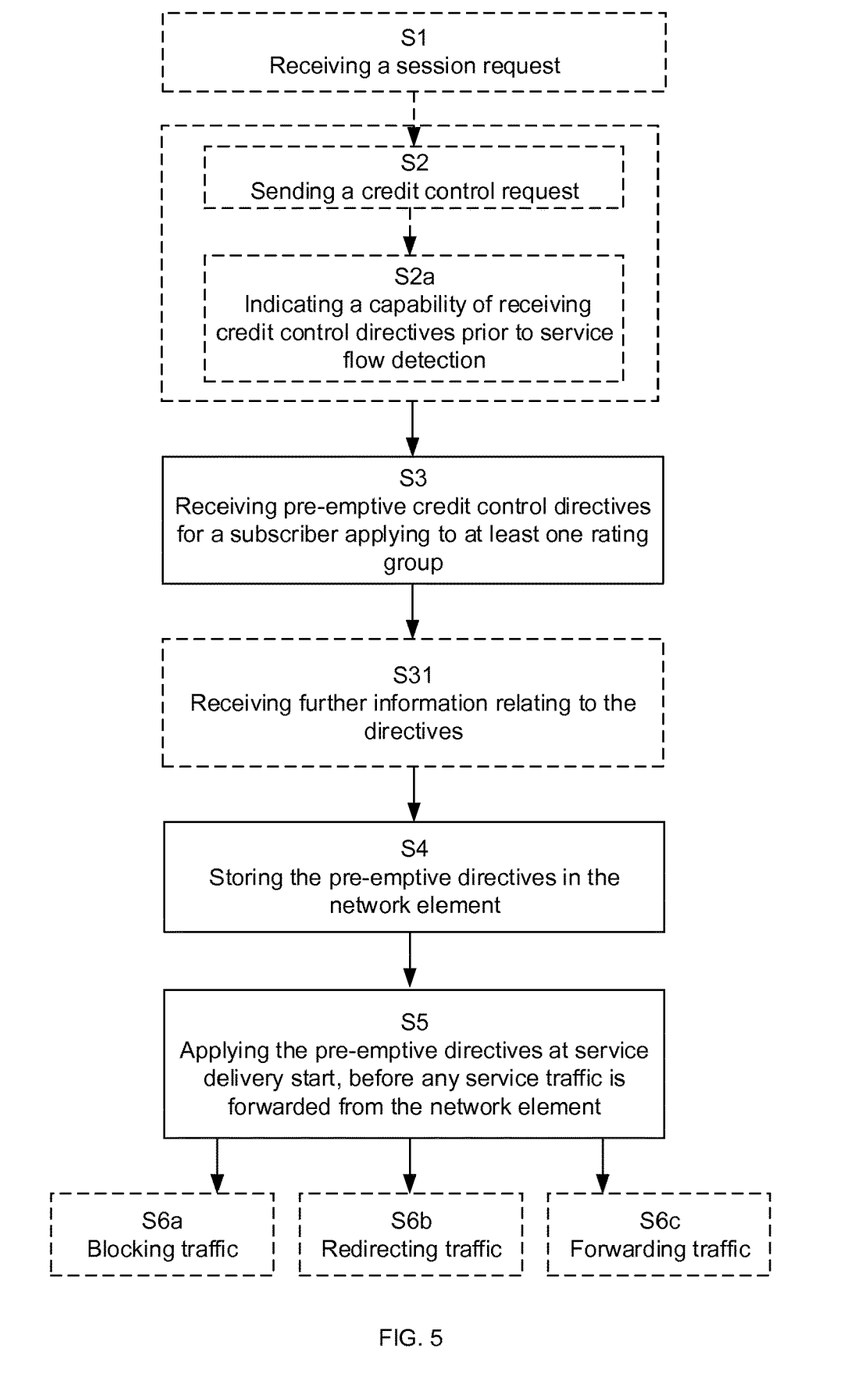
FIG. 5 is a flowchart illustrating embodiments of method steps performed in a network element.

FIG. 5 is a flow diagram depicting example operations which may be taken by the network element 1 of FIG. 1, during pre-emptive credit control, according to some of the example embodiments. According to some aspect this disclosure relates to method, performed in a network element, of performing pre-emptive credit control. Pre-emptive credit control implies that directives applying to a certain rating group for one or several subscribers may be pre-emptively installed in a network element, such as in a packet gateway in a core network. Such a solution implies that an operator may block all traffic belonging to a certain rating group for a certain subscriber. In one example all internet traffic is blocked. In another example all traffic targeting a proprietary network is redirected to another packet gateway.

According to some aspects the method in initiated when a session request is received 51 from the subscriber. The processing circuitry 12 is configured to receive the session request using the network interface 11. According to some aspects, the network element comprises a first receiver module 121 configured for this purpose. For example an internet session is requested as described above. However, the service request is here initiated by the external subscriber, but may be initiated either by the user or the other network element. At this stage, there is typically only a request for an IP connection, but the service, and thereby not even the rating group, is not yet known.

According to some aspects the method then comprises sending S2 a credit control request for the subscriber to an online charging system. The at least one pre-emptive credit control directive is received in response to the credit control request. The processing circuitry 12 is configured to sending S2 a credit control request for the subscriber to an online charging system using the network interface 11. According to some aspects, the network element comprises a sender module 122 configured for this purpose.

Figure 4:
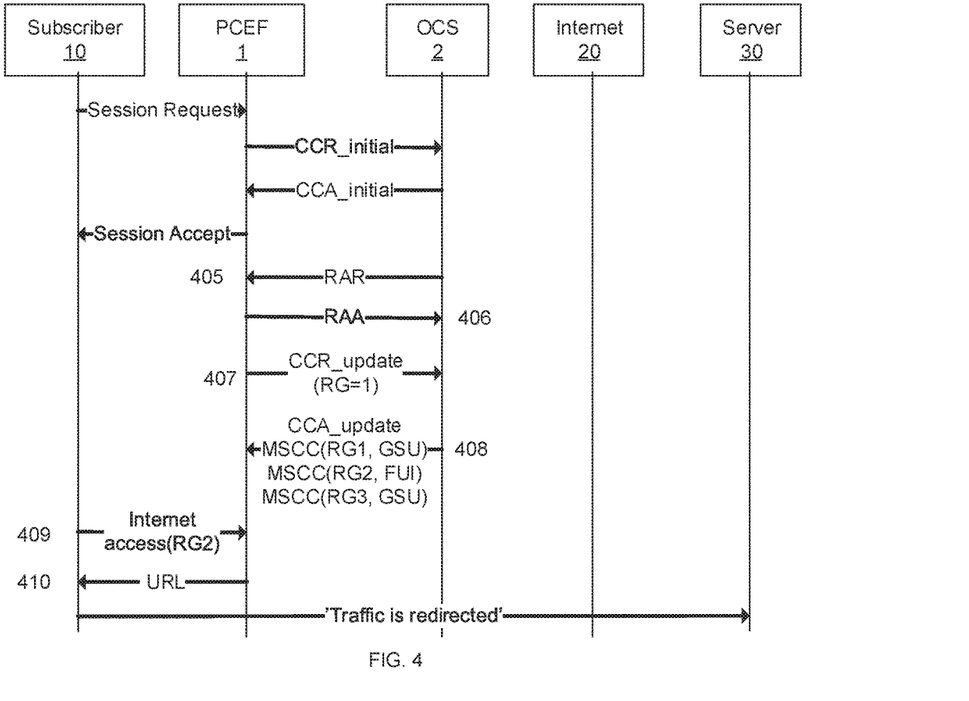

According to some aspects the credit control request is an initial request or an update request, as described above. However, it is also possible that the OCS takes initiative to the contact as will be further exemplified in FIG. 4.

According to some aspects the method further comprises indicating S2a a capability of receiving credit control directives prior to service flow detection. If the handling of pre-emptive credit control is a mandatory feature, it may be desired that the subscriber indicates to the network its capability to receive credit control directives prior to service flow detection. Such a capability is e.g. included in an initial credit control request. Such an indication may e.g. be made using the Requested Service Type, RSU, in the initial request message. Such a solution would imply that Requested Service Type would need to be introduced on command level in 3GPP TS 32.299 V12.4.0 (2014-03).

According to some aspects the credit control request is an initial request comprising an indication about relevant rating groups. Hence, the network element indicates e.g. rating groups that are expected to be used, such that the OCS may send the corresponding directives.

The method then comprises the step of receiving S3, from an online charging system, at least one pre-emptive credit control directive for a subscriber, the credit control directive applying to at least one rating group. This step implies that the network element receives preemptive credit control directives from an online charging system. The processing circuitry 12 is configured to receive, using the network interface 11, from an online charging system, at least one pre-emptive credit control directive for a subscriber. According to some aspects, the network element comprises a second receiver module 123 configured for this purpose.

Figure 2B:
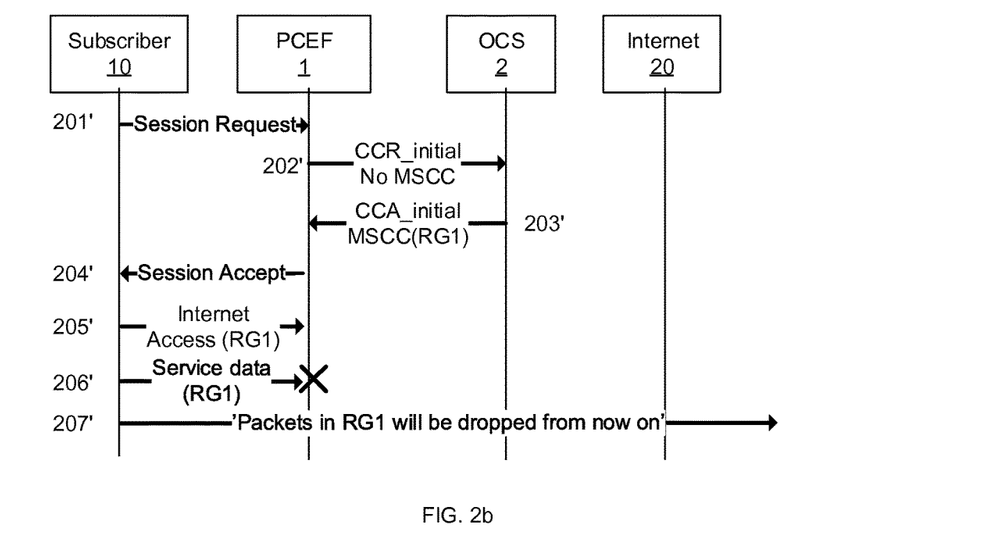

Referring back to the example in FIG. 2, a modified scenario wherein pre-emptive credit control is implemented, is illustrated in FIG. 2b. Steps 201' and 202' corresponds to steps 201 and 202 of FIG. 2a. However, the introduction of pre-emptive credit control implies e.g. that Multi Service Credit Control, MSCC, can instead be included in an initial Credit Control Answer 203' (CCA_initial, sent by OCS) as the answer to an initial Credit Control Request 202' (CCR_initial, sent by network node) for a Rating Group that is not included in this CCR. This implies that the OCS can send credit control directives before the service is known to the network element. The network node will then send a session accept 204' to the subscriber as in the previous example of FIG. 2a.

Hence, when the Internet service corresponding to a specific rating group is then requested 205', the network node can right away terminate 206' the request. Hence, all packets will be dropped 207' from delivery start. No traffic supposed to be blocked is let through.

In this alternative MSCC, the OCS can include other 'Result Codes' than 'success' by e.g. including Final Unit Indication, FUI, or Final Unit Action, FUA, i.e. 'redirect' or 'terminate', as will be further explained below.

According to some aspects the method further comprises receiving S31 from the online charging system control further information relating to the at least one pre-emptive credit control directive. It must be anticipated that additional credit control information is needed such as duration info etc. Validity-time should be set purposely considering under how long time the user is supposed to be redirected. It can be set to considerably longer time when it is provisioned in a CCA-initial. The Validity-Time will guard the period when redirection shall be performed by the network element.

The method then comprises storing S4 the at least one pre-emptive credit control directive in the network element. This step implies e.g. that the directives are installed in the network element, such that they may be applied to incoming traffic. Some kind of storing is needed, in order to be able to apply the directives at a later point in time. The processing circuitry 12 is configured to store the at least one pre-emptive credit control directive in the network element. The at least one pre-emptive credit control directive is typically stored in the memory 13. According to some aspects, the network element comprises a storer 124 configured for this purpose The method further comprises, applying S5 the at least one pre-emptive credit control directive at content or service delivery start, prior to any service or content received from, or addressing, the subscriber and belonging to the at least one rating group being forwarded from the network element. This implies that credit control directives are installed prior to the service flow detection, such that when a new session is requested, the directives may be applied already at delivery start, before any traffic it forwarded. Thereby all unwanted traffic may be blocked or re-directed. Hence, once the matching traffic to the RG is detected, since the directives are already installed in advance by OCS, the network element can start applying the handling immediately. In case 'blocking' is intended (that is an error-type result-code is installed), the payload will be dropped; in case 'redirection' is intended, the redirect-able traffic will be redirected at once. The processing circuitry 12 is configured to applying the at least one pre-emptive credit control directive at content or service delivery start. According to some aspects, the network element comprises an applier 125 configured for this purpose.

According to some aspects the method further comprises blocking S6a service or content that matches the at least one pre-emptive credit control directive. For example all data traffic is blocked for users having a certain type of subscription. According to some aspects the method further comprises redirecting S6b service or content that matches the at least one pre-emptive credit control directive. Re-directing may be desired for routing purposes, when a rating group corresponds to a certain source. A redirect-URL is also included in case FUA='redirect'.

According to some aspects the method further comprises forwarding service or content from the network element. Traffic not matching the pre-emptive directives is not affected by the directives and will be forwarded as in prior art.

The processing circuitry 12 is configured to block, redirect or forward service or content from the network element. According to some aspects, the network element comprises a director 126 configured for this purpose According to some aspects the at least one pre-emptive credit control directive comprises result codes corresponding to rules applying to respective charging groups. The result code of the MSCC can be any error-type result-code that is applicable for MSCC level. The most proper ones can be Result-Code AVP: 10, 11, 12 and 5031 as defined in 3GPP TS 32.299 V12.4.0 (2014-03) section.

Now turning to back to FIG. 7, the first receiver module 121, the sender module 122, the second receiver module 123, the storer 124, the applier 125 and the director 126 are implemented in hardware or in software or in a combination thereof. The modules 121, 122, 123, 124, 125 are according to some aspects implemented as a computer program stored in a memory 14 which run on the processing circuitry 12. The network element 1 is further configured to implement all the aspects of the disclosure as described in relation to the methods above. The network element also comprises the corresponding modules. Hence, according to one aspect the disclosure relates to a computer program comprising computer program code which, when executed in the network element, causes the network element 1 to execute the methods described above and below.

Figure 8:
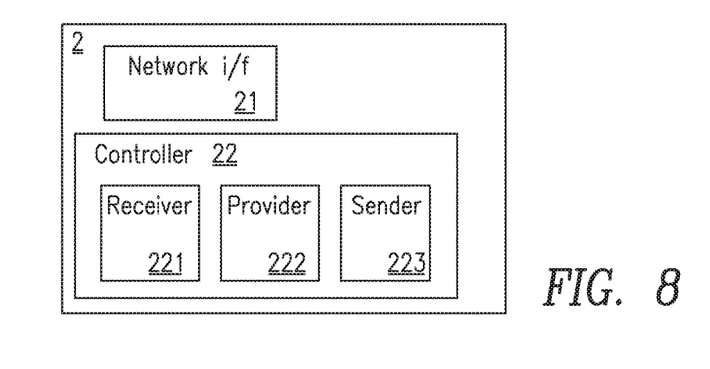
FIG. 8 is an example node configuration of an OCS node, according to some of the example embodiments.

FIG. 8 illustrates an example of an online charging system node 2 for enabling pre-emptive credit control in a network element 1. The online charging system node comprises a network interface 21 and processing circuitry or controller 22 which is configured to provide, in the online charging system, at least one pre-emptive credit control directive for a subscriber, applying to at least one rating group, and to send, using the network interface 21, to the network element, the provided at least one pre-emptive credit control directive, prior to any service or content received from or addressing the subscriber and belonging to the at least one rating group being forwarded from the network element, thereby enabling application of the at least one pre-emptive credit control directive on the service or content at content or service delivery start.

The processing circuitry 21 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Figure 6:
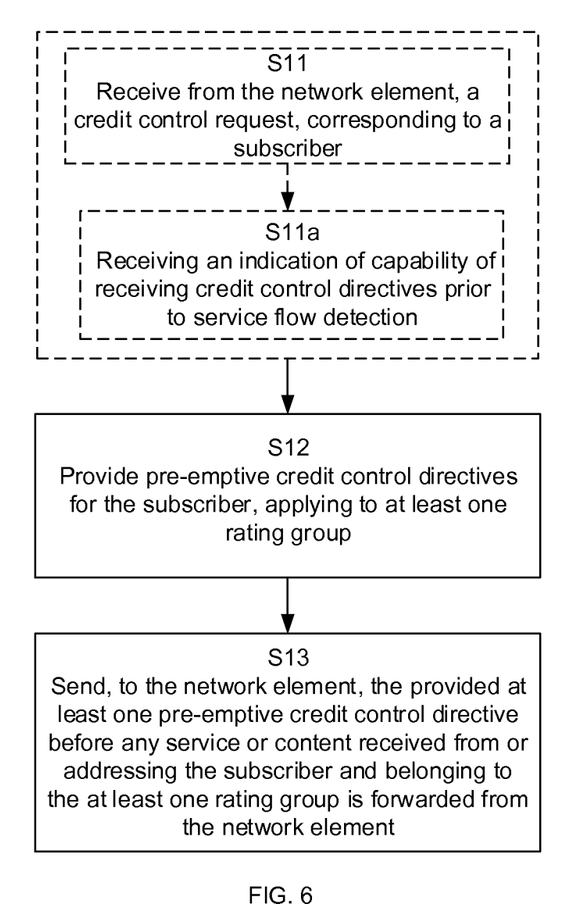
FIG. 6 is a flowchart illustrating embodiments of method steps performed in an OCS node.

FIG. 6 is a flow diagram depicting corresponding example operations which may be taken by online charging system, OCS, node 2 of FIG. 8, during pre-emptive credit control, according to some of the example embodiments.

In the first step the OCS node provides S12, in the online charging system, at least one pre-emptive credit control directive for a subscriber, applying to at least one rating group. The directives may be obtained in several ways. The rules may be obtained internally in the OCS or received from external sources. The processing circuitry 22 is configured to provide S12, in the online charging system, at least one pre-emptive credit control directive for a subscriber, applying to at least one rating group. According to some aspects, the OCS node comprises a provider 222 configured for this purpose.

Users can also be redirected to a notification webpage where the instruction can be presented for how to continue with the access and the alternatives that the end-user might choose.

This solution can be useful for roaming (home-routed) or local-breakout case, where credit control on the end user usually differ from non-roaming case. However the solution is generic and doesn't have to be limited only for roaming or local-breakout use cases.

According to some aspects, the providing is based on network or service requested in the credit control request. One example is that the data quota for a specific subscriber is finished. Then all internet access from that subscriber may be blocked.

According to some aspects, the providing is based on an Access Point Name comprised in the credit control request. For example access to an operator's portal may always be allowed, but such traffic should always use a certain gateway.

In the next step the OCS node sends S13, to the network element, the provided at least one pre-emptive credit control directive, prior to any service or content received from or addressing the subscriber and belonging to the at least one rating group being forwarded from the network element, thereby enabling application of the at least one pre-emptive credit control directive on the service or content at content or service delivery start. The network element then receives and applies the pre-emptive directives as already described above in connection with FIG. 5. The processing circuitry 22 is configured to send S13, to the network element, the provided at least one pre-emptive credit control directive, using the network interface 21. According to some aspects, the OCS node comprises a sender 223 configured for this purpose.

According to some aspects, the method further comprises receiving S11, from the network element, a credit control request, corresponding to a subscriber, wherein the at least one pre-emptive credit control directive is provided in a credit control response sent in response to the credit control request. The processing circuitry 22 is configured to receive S11, from the network element, a credit control request, using the network interface 21. According to some aspects, the OCS node comprises a receiver module 221 configured for this purpose. A typical scenario is the one already explained in FIG. 2b, wherein the OCS receives a CCR on command level, i.e. wherein no rating group is specified. According to the proposed technique the OCS then responds with a CCA comprising credit control directives, e.g. MSCC, for at least one rating group.

FIG. 6 shows another alternative of initiating the proposed method, wherein the OCS node 2 initiates the installation of pre-emptive directions by sending a Re Authorization Request, RAR, 405 to network element. To request credit re-authorization for a service or a rating-group, the server includes in the Rating-Group Attribute Value Pair, AVP. If a credit re-authorization is not already ongoing (i.e., the credit-control session is in Open state), a credit control client that receives an RAR message with Session-Id equal to a currently active credit-control session MUST acknowledge the request by sending the Re-Auth-Answer, RAA, 406 message and MUST initiate the credit re-authorization toward the server by sending a Credit-Control-Request message 407 with the CC-Request-Type AVP set to the value UPDATE_REQUEST. The OCS node 2 can then insert the pre-emptive credit control directives in the corresponding CCA 408. In this example the CCA comprises credit control directives corresponding to several rating groups i.e. RG1, RG2, RG3. For RG2 the 'result code' is FUI='redirect'. Hence arriving traffic 409 of RG2 will from now on be redirected to the node defined by the URL 410, which was typically received from the OCS in the CCA together with the FUI. Hence, according to some aspects, the sending is initiated by the OCS.

According to some aspects, the method further comprises receiving S11a an indication of a capability of receiving credit control directives prior to service flow detection. It must be assumed that the ability to receiving credit control directives prior to service flow detection may be an optional feature. Then the network element may as an initial step indicate that it has such a capability. According to some aspects, the OCS is only allowed to send pre-emptive credit control directives if the network element has previously indicated such capability.

Now turning to FIG. 8, the receiver module 221, the provider 222 and the sender 223 are implemented in hardware or in software or in a combination thereof. The modules 221, 222, 223 are according to some aspects implemented as a computer program stored in a memory which run on the processing circuitry 22. The OCS node is further configured to implement all the aspects of the disclosure as described in relation to the methods performed in an OCS node above. The OCS node also comprises the corresponding modules. Hence, according to one aspect the disclosure relates to a computer program comprising computer program code which, when executed in an OCS node, causes the OCS node 2 to execute the methods described above and below.

The disclosure can be described in different topics though they share the same principle of 'being pre-emptive'. One example is pre-emptive result-code handling as already illustrated in FIG. 2b. Another alternative is pre-emptive redirection directives, which has already been briefly mentioned.

Figure 3A:
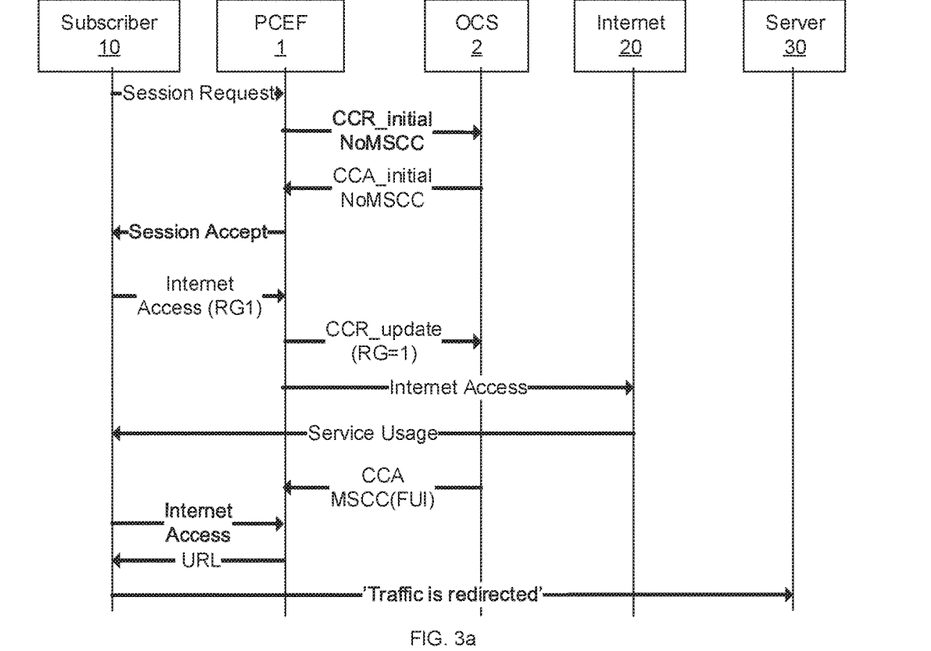
Figure 3B:
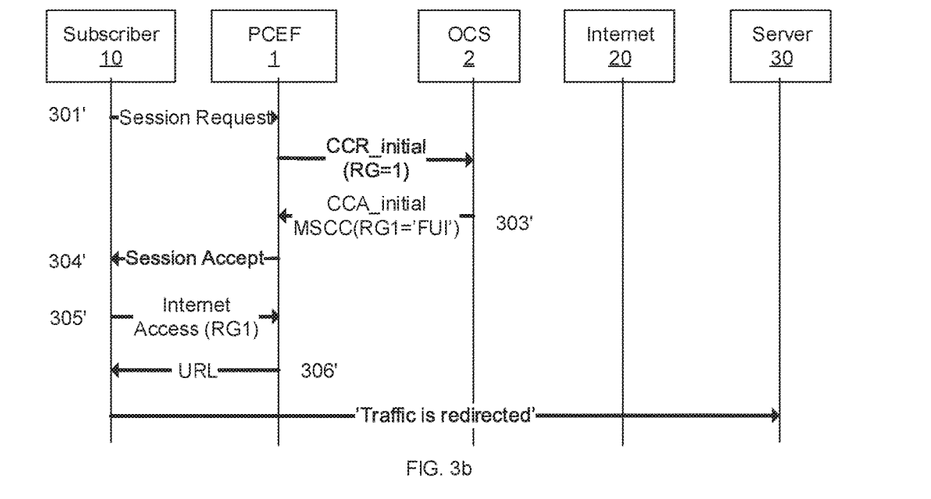

FIGS. 3a and 3b illustrates non-preemptive redirection directives and preemptive redirection directives respectfully. The signaling of FIGS. 3a and 3b corresponds to FIGS. 2a and 2b with the difference that the CCA 309 comprises the result code 'FUI=redirect'. This result code implies that traffic is supposed to be redirected to a "top-up" server 30. Hence, with respect to FIG. 3a traffic, which is supposed to be re-directed, might pass through the network, when waiting for the response to the CCR update.

This is avoided in FIG. 3b, where the redirection directive is pre-emptively installed, by including the FUI in the initial CCA 303'. A redirect-URL of e.g. a "top-up" server 30 is also included in the CCA in case FUA='redirect'. Top-up is referring to a 'refill' portal. It is a service that operator provides to the end-user to update the account for credit. Hence, when the internet service corresponding to a specific rating group is then requested 305', the network node can right away redirect 306' the request by sending 308' the redirect-URL to the subscriber. Hence, all packets will be redirected 309' from delivery start. No traffic supposed to be redirected is let through.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus.

Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a network element, of performing pre-emptive credit control, the method comprising:
receiving, from an online charging system, at least one pre-emptive credit control directive for a subscriber, the credit control directive applying to at least one rating group;
storing the at least one pre-emptive credit control directive in the network element; and
applying the at least one pre-emptive credit control directive affecting a traffic flow through the network element of one of content and service delivery start, prior to any service or content received from, or addressing, the subscriber and belonging to the at least one rating group being forwarded from the network element.

2. The method of claim 1, further comprising:
receiving a session request from the subscriber.

3. The method of claim 1, further comprising:
sending a credit control request for the subscriber to an online charging system;
wherein the at least one pre-emptive credit control directive is received in response to the credit control request.

4. The method of claim 1, further comprising:
indicating a capability of receiving credit control directives prior to service flow detection.

5. The method of claim 4, wherein the credit control request is one of an initial request and an update request.

6. The method of claim 4, wherein the credit control request is an initial request comprising an indication about relevant rating groups.

7. The method of claim 1, further comprising:
receiving from the online charging system control further information relating to the at least one pre-emptive credit control directive.

8. The method of claim 1, further comprising blocking the one of service and content that matches the at least one pre-emptive credit control directive.

9. The method of claim 1, further comprising redirecting the one of service and content that matches the at least one pre-emptive credit control directive.

10. The method of claim 1, further comprising forwarding the one of service and from the network element.

11. The method of claim 1, wherein the at least one pre-emptive credit control directive comprises result codes corresponding to rules applying to respective charging groups.

12. A network element for performing pre-emptive credit control, the network element comprising, a network interface and a processing circuitry configured:
to receive, using the network interface, from an online charging system, at least one pre-emptive credit control directive for a subscriber, the credit control directive applying to at least one rating group;
to store the at least one pre-emptive credit control directive in the network element; and
to apply the at least one pre-emptive credit control directive affecting a traffic flow through the network element of one of content and service delivery start, prior to any service or content received from, or addressing, the subscriber and belonging to the at least one rating group being forwarded from the network element.

13. The network element of claim 12, wherein the processing circuitry is further configured:
to indicate the capability of even receiving directives prior to the service flow detection.

14. The network element of claim 12, wherein the processing circuitry is further configured:
   to receive a session request from the subscriber.

15. The network element of claim 12, wherein the processing circuitry is further configured:
   to send a credit control request for the subscriber to an online charging system;
   wherein the at least one pre-emptive credit control directive is received in response to the credit control request.

16. The network element of claim 12, wherein the processing circuitry is further configured:
   to receive from the online charging system control further information relating to the at least one pre-emptive credit control directive.

17. A method, performed in an online charging system, of enabling pre-emptive credit control in a network element, the method comprising:
   providing, in the online charging system, at least one pre-emptive credit control directive for a subscriber, applying to at least one rating group, and
   sending, to the network element, the provided at least one pre-emptive credit control directive, prior to one of any service and content received from or addressing the subscriber and belonging to the at least one rating group being forwarded from the network element, thereby enabling application of the at least one pre-emptive credit control directive affecting a traffic flow through the network element of one of content and service delivery start, prior to any service or content received from, or addressing, the subscriber and belonging to the at least one rating group being forwarded from the network element.

18. The method of claim 17, further comprising:
   receiving from the network element, a credit control request, corresponding to a subscriber, wherein the at least one pre-emptive credit control directive is provided in a credit control response sent in response to the credit control request.

19. The method of claim 17, further comprising receiving an indication of a capability of receiving credit control directives prior to service flow detection.

20. The method of claim 17, wherein the providing is based on one of network and service requested in the credit control request.

21. The method of claim 17, wherein the providing is based on an Access Point Name comprised in the credit control request.

22. The method of claim 17, wherein the providing is based on subscriber data corresponding to the subscriber.

23. An online charging system node for enabling pre-emptive credit control in a network element, the node comprising, a network interface and a processing circuitry configured:
   to provide, in the online charging system, at least one pre-emptive credit control directive for a subscriber, applying to at least one rating group, and
   to send, using the network interface, to the network element, the provided at least one pre-emptive credit control directive, prior to one of any service and content received from or addressing the subscriber and belonging to the at least one rating group being forwarded from the network element, thereby enabling application of the at least one pre-emptive credit control directive affecting a traffic flow through the network element of one of content and service delivery start, prior to any service or content received from, or addressing, the subscriber and belonging to the at least one rating group being forwarded from the network element.

24. The online charging system node of claim 23, wherein the processing circuitry is further configured:
   to receive from the network element, a credit control request, corresponding to a subscriber.

25. The online charging system node of claim 24, wherein the processing circuitry is further configured:
   to receive an indication of a capability of receiving directives prior to service flow detection.

26. A computer program product having stored thereon, computer program code which, when executed in a network node, causes the network node to execute a method comprising:
   receiving, from an online charging system, at least one pre-emptive credit control directive for a subscriber, the credit control directive applying to at least one rating group;
   storing the at least one pre-emptive credit control directive in the network element; and
   applying the at least one pre-emptive credit control directive affecting a traffic flow through the network element of one of content and service delivery start, prior to any service or content received from, or addressing, the subscriber and belonging to the at least one rating group being forwarded from the network element.

* * * * *

UNITED STATES PATENT AND TRADEMARK OFFICE
CERTIFICATE OF CORRECTION

PATENT NO. : 10,038,796 B2
APPLICATION NO. : 14/440696
DATED : July 31, 2018
INVENTOR(S) : Yang et al.

Page 1 of 2

It is certified that error appears in the above-identified patent and that said Letters Patent is hereby corrected as shown below:

In the Specification

In Column 2, Lines 59-60, delete "pre-emotive" and insert -- pre-emptive --, therefor.

In Column 4, Line 22, delete "pre-emotive" and insert -- pre-emptive --, therefor.

In Column 4, Line 39, delete "architecture" and insert -- architecture; --, therefor.

In Column 4, Line 40, delete "Handling" and insert -- Handling; --, therefor.

In Column 4, Line 41, delete "Handling" and insert -- Handling; --, therefor.

In Column 4, Line 42, delete "Directives" and insert -- Directives; --, therefor.

In Column 4, Line 43, delete "Directives" and insert -- Directives; --, therefor.

In Column 4, Line 45, delete "Directives" and insert -- Directives; --, therefor.

In Column 4, Line 53, delete "embodiments;" and insert -- embodiments. --, therefor.

In Column 4, Line 65, delete "Application," and insert -- Application --, therefor.

In Column 5, Line 8, delete "Charging" and insert -- Charging Control --, therefor.

In Column 7, Line 50, delete "in initiated" and insert -- is initiated --, therefor.

In Column 7, Line 51, delete "51" and insert -- S1 --, therefor.

In Column 9, Line 23, delete "it forwarded." and insert -- is forwarded. --, therefor.

Signed and Sealed this
Nineteenth Day of March, 2019

Andrei Iancu
*Director of the United States Patent and Trademark Office*

CERTIFICATE OF CORRECTION (continued)
U.S. Pat. No. 10,038,796 B2

In Column 9, Line 62, delete "to back" and insert -- back --, therefor.

In Column 10, Line 25, delete "processing circuitry 21" and insert -- processing circuitry 22 --, therefor.